(12) United States Patent
Lee

(10) Patent No.: US 7,952,615 B2
(45) Date of Patent: May 31, 2011

(54) APPARATUS FOR DIGITAL IMAGE STABILIZATION USING OBJECT TRACKING AND METHOD THEREOF

(75) Inventor: Young-Sin Lee, Seoul (KR)

(73) Assignee: Core Logic, Inc., Seoul (KR)

( * ) Notice: Subject to any disclaimer, the term of this patent is extended or adjusted under 35 U.S.C. 154(b) by 419 days.

(21) Appl. No.: 12/263,133

(22) Filed: Oct. 31, 2008

(65) Prior Publication Data

US 2009/0115859 A1    May 7, 2009

(30) Foreign Application Priority Data

Nov. 2, 2007   (KR) .................. 10-2007-0111487

(51) Int. Cl.
*H04N 5/228* (2006.01)
*G06K 9/00* (2006.01)
*G03B 17/00* (2006.01)

(52) U.S. Cl. ........... 348/208.99; 348/208.14; 348/208.4; 348/222.1; 382/103; 396/55

(58) Field of Classification Search ............. 348/208.99, 348/208.4, 169–172, 222.1; 396/55; 382/103
See application file for complete search history.

(56) References Cited

U.S. PATENT DOCUMENTS

| | | | | |
|---|---|---|---|---|
| 6,985,172 | B1 * | 1/2006 | Rigney et al. | 348/149 |
| 7,773,115 | B2 * | 8/2010 | Estevez et al. | 348/208.13 |
| 2001/0017650 | A1 * | 8/2001 | Bober et al. | 348/158 |
| 2003/0035051 | A1 * | 2/2003 | Cho et al. | 348/169 |
| 2003/0223010 | A1 | 12/2003 | Kaplinsky | |
| 2006/0017837 | A1 | 1/2006 | Sorek et al. | |
| 2006/0127084 | A1 | 6/2006 | Okada | |
| 2007/0147820 | A1 * | 6/2007 | Steinberg et al. | 396/155 |
| 2010/0026839 | A1 * | 2/2010 | Border et al. | 348/231.2 |

FOREIGN PATENT DOCUMENTS

| | | |
|---|---|---|
| WO | WO 2006/097680 | 9/2006 |
| WO | WO 2007/043575 | 5/2007 |

OTHER PUBLICATIONS

Jose-Luis Landabaso et al., "Robust Tracking and Object Classification Towards Automated Video Surveillance," Lecture Notes in Computer Science, Springer Verlag, Berlin, Germany, vol. 3212, Jan. 1, 2004, pp. 463-470, XP007906869.

* cited by examiner

*Primary Examiner* — Lin Ye
*Assistant Examiner* — Mekonnen Dagnew
(74) *Attorney, Agent, or Firm* — Edwards Angell Palmer & Dodge LLP; Kongsik Kim

(57) ABSTRACT

Apparatus for digital image stabilization using object tracking includes an image signal processing unit that outputs a first digital image obtained under a first exposure value condition and a plurality of second digital images obtained under a second exposure value condition. The apparatus also includes a shaky hand compensating unit that compensates for motion in comparative second digital images relative to a reference second digital image by tracking an object in either a binary image or a reverse binary image of a respective second digital image that has the most objects (i.e., in the binary or reverse image). The compensating unit then generates a shaky hand compensated image by overlapping the motion-compensated images with the reference image. The apparatus further includes an image property correcting unit that corrects a property of the shaky hand compensated image based on a property of the first digital image.

20 Claims, 7 Drawing Sheets

APPARATUS FOR DIGITAL IMAGE STABILIZATION USING OBJECT TRACKING AND METHOD THEREOF

CLAIM OF PRIORITY

This application claims priority under 35 U.S.C. §119(a) to Korean Patent Application No. 10-2007-0111487, filed on Nov. 2, 2007, in the Korean Intellectual Property Office, the entire contents of which are hereby incorporated by reference.

FIELD OF THE INVENTION

The invention relates to digital image processing, and in particular, to an apparatus and method for digital image stabilization that can correct an image blurring phenomenon caused by shaky hands at the time of obtaining a digital image.

BACKGROUND OF THE INVENTION

Recently, digital cameras using an image sensor technology such as CCD (Charge Coupled Device) or CMOS (Complementary Metal-Oxide Semiconductor) have become very popular. The digital camera is commercialized as a camera-only-product and typically is mounted in a hand-held terminal such as a mobile phone or PDA (personal digital assistant).

However, the central processing unit of the hand-held terminal does not have the high clock speed and memory capacity of a personal computer, which may limit the hand-held terminal's ability to perform digital image processing. Moreover, development trends toward reduced thickness and size of the hand-held terminal results in a spatial limitation with respect to the size of additional hardware and devices, such as a camera, that can be mounted in a hand-held terminal. Accordingly, there are limitations in the number and types of image processing techniques, such as, for example, a digital image stabilization technique for preventing deterioration of a digital image caused by shaky hands of a photographer, that can be incorporated in a camera-only-product of a hand-held terminal.

A typical digital camera supports an auto exposure mode, where EV (Exposure Value) is automatically changed depending on the luminance of the location where a photograph is taken. EV is increased in dark places and decreased in bright places.

However, an increase in EV causes an increase in exposure time. This can result in an image blurring phenomenon since a small tweak in a focus caused by shaky hands is reflected in a photograph. Known image stabilization techniques were introduced to prevent the image blurring phenomenon, such as, for example, DIS (Digital Image Stabilization), EIS (Electrical Image Stabilization) and OIS (Optical Image Stabilization).

The DIS technique detects/compensates for the shaky-hands effect using an image signal stored in a memory. The DIS technique detects a motion vector using an image signal that is generated in an image pickup device and stored in a memory, and changes a read timing of the memory using the detected motion vector to compensate for shaky hands. The DIS technique has an advantage of simple image stabilization. However, because a read timing of a memory is changed, the size of an image readable from the memory is equal to that of an effective pixel area. Thus, the DIS technique expands an image read from the memory by digital zoom and plays/records the expanded image, which results in deterioration of image quality.

The EIS technique detects/compensates for the shaky-hands effect using an angular velocity sensor and a high pixel image pickup device. The EIS technique detects the amount and direction of hand tremor using a horizontal/vertical angular velocity sensor, and changes an output timing of a high pixel image pickup device using the detected amount and direction of hand tremor to compensate for shaky hands. As an output timing of a high pixel image pickup device is changed, the size of an image that is composed of an image signal output from the high pixel image pickup device is equal to that of an original image. This occurs because the high pixel image pickup device used in the EIS technique has more pixels than the number of effective pixels. Thus, the EIS technique can reduce the deterioration of image quality. However, the EIS technique requires an angular velocity sensor and a high pixel image pickup device, which results in an increase in manufacturing costs.

The OIS technique detects/compensates for the shaky-hands effect using an angular velocity sensor and a prism. The OIS technique uses the same technique as the EIS technique in that the amount and direction of hand tremor is detected using a horizontal/vertical angular velocity sensor. However, the difference is that the OIS technique uses a prism capable of changing a path of light incident upon an image pickup device to compensate for shaky hands. The OIS technique does not result in a deterioration of image quality and does not require a high image pickup device. However, the OIS technique requires an angular velocity sensor and a prism, which increases both the size and manufacturing costs of a photographing device. Further, the OIS technique has difficulty controlling the prism.

SUMMARY OF THE INVENTION

An object of the invention is to provide an apparatus and method for digital image stabilization that eliminates the need for separate hardware, such as an angular velocity sensor or a prism to compensate for shaky hands.

Another object of the invention is to provide an apparatus and method for digital image stabilization that reduces the deterioration of image quality and an image blurring phenomenon in a digital camera mounted in a terminal having limited hardware resources, such as a mobile phone or PDA.

To achieve the above-mentioned objects, an apparatus for digital image stabilization using object tracking according to the invention includes: (1) an image signal processing unit for outputting a first digital image obtained under a first exposure value condition and a plurality of second digital images obtained under a second exposure value condition; (2) a shaky hand compensating unit to (a) compensate for motion of comparative second digital images relative to a reference second digital image by tracking an object in an image having multiple objects where the image is either a binary or reverse binary image of a respective second digital image (the binary or reverse binary image with the most objects is selected), and (b) generate a shaky hand compensated image by overlapping the motion-compensated images with the reference image; and (3) an image property correcting unit for correcting a property of the shaky hand compensated image based on a property of the first digital image.

Preferably, the first digital image is a preview image obtained under the exposure value condition of an auto exposure mode, and the plurality of second digital images is captured still image data obtained continually at a regular interval under the exposure value condition that is lower than the exposure value condition of the auto exposure mode.

According to the invention, the shaky hand compensating unit includes: (1) an object labeling unit for tracking and labeling an object in binary or reverse binary images; (2) a motion value computing unit for (a) matching an object parameter of each comparative image with the corresponding object of the reference image, (b) calculating an object parameter for each comparative image, and (c) computing a motion value for each comparative image using the computed object parameter; (3) a motion compensating unit for applying each computed motion value to a corresponding comparative image to compensate for motion of each comparative image; and (4) a compensated image generating unit for overlapping each motion-compensated comparative image with the reference image to generate a shaky hand compensated image.

Preferably, the object labeling unit includes: (1) an image binarizer for converting the reference image and each comparative image into binary images; (2) an image reverser for converting the binary images of the reference image and each comparative image into reverse binary images; (3) an object labeler for labeling objects on each binary image and each reverse binary image; and (4) an image selector for (a) comparing the number of objects in the binary image of the reference image with the number of objects in the reverse binary image of the reference image, and (b) selecting the image with more objects as the object tracking image.

More preferably, the object labeling unit further includes: (1) an image filter for filtering the reference image and each comparative image to sharpen the boundaries of the images; and (2) an image synthesizer for (a) synthesizing the boundary-sharpened images from the image filter with the binary images, (b) synthesizing the boundary-sharpened images from the image filter with the reverse binary images from the image reverser, and (c) outputting the synthesized binary and reverse binary images. The object labeling unit also labels the objects in the synthesized binary and reverse binary images.

According to the invention, the apparatus may further include an image resizer coupled before the object labeling unit that resizes the plurality of second digital images by either scaling the sizes of the second digital images to a predetermined size or clipping the boundaries of a predetermined width from the second digital images. The apparatus may alternatively include an image selecting unit coupled before the object labeling unit that excludes a comparative image from images for object labeling if (1) the magnitude of a motion vector of the comparative image relative to the reference image exceeds a critical value, or (2) the difference in brightness between the reference image and the comparative image does not exceed a critical value.

Preferably, the image property correcting unit includes a color correcting unit for correcting color of the shaky hand compensated image. The correcting unit corrects color by (a) replacing the pixel data of the shaky hand compensated image with pixel data of the first digital image, or (b) by interpolating the pixel data of the shaky hand compensated image based on the pixel data of the first digital image in consideration of a size ratio between the shaky hand compensated image and the first digital image. The image property correcting unit may additionally or alternatively include a brightness correcting unit for (a) computing quantitatively a difference in brightness between the shaky hand compensated image and the first digital image, (b) selecting adaptively a brightness correcting intensity, and (c) correcting the brightness of the shaky hand compensated image by the selected intensity.

The invention also includes methods of digital image stabilization using object tracking with binary or reverse binary images.

BRIEF DESCRIPTION OF THE DRAWINGS

The features and advantages of the invention will become more apparent upon consideration of the detailed description taken in conjunction with the accompanying drawings, in which like reference characters refer to like parts throughout, and in which.

DETAILED DESCRIPTION OF THE INVENTION

Figure 1:
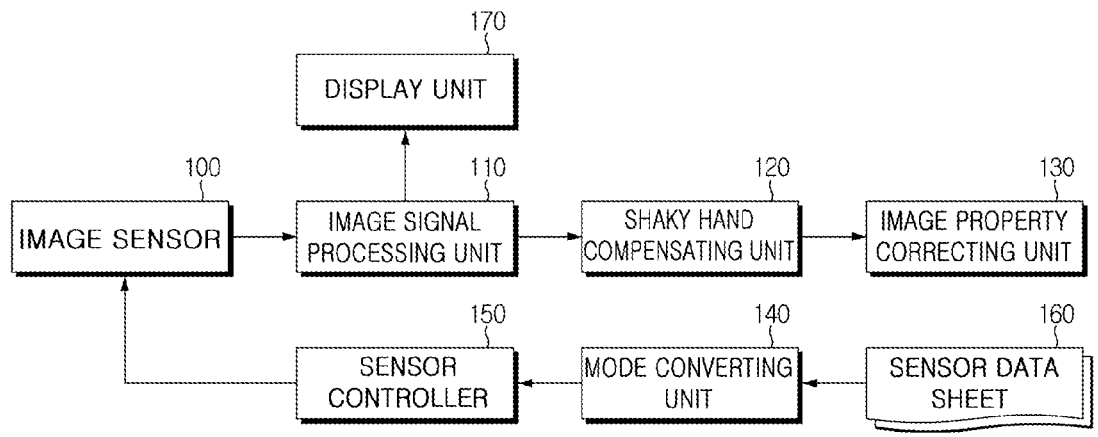
FIG. 1 illustrates an apparatus for digital image stabilization using object tracking according to an embodiment of the invention.

While this specification contains many specifics, these should not be construed as limitations on the scope of the invention or the claims, but rather as descriptions specific to particular embodiments of the invention. Certain features that are described in this specification in the context of separate embodiments may also be implemented in a single embodiment. Conversely, various features that are described in the context of a single embodiment may also be implemented in multiple embodiments separately or in any suitable subcombination.

It should be understood that the terms used in the specification and the appended claims are not necessarily limited to general dictionary meanings, but should be interpreted based on the meanings and concepts corresponding to technical aspects of the invention as described herein.

Apparatus for digital image stabilization using object tracking according to the invention is associated with various digital photographing devices, such as, for example, a digital camera, a digital camcorder, a mobile phone, a PDA and a personal multimedia player with built-in digital camera. Digital photographing devices are configured to (a) obtain an image by a user's operation of a shutter, (b) convert the obtained image into a digital image, and (c) store the digital image in a storage medium.

Unlike a conventional camera, the commercial digital photographing device supports a preview function for viewing an image through a view finder display, such as an LCD (liquid crystal display), before the photograph is taken. Thus, a user can check the image, which is updated at a short frame interval. When the user sees a desired image on the view finder, the user operates a shutter to obtain a digital still image.

Apparatus for digital image stabilization using object tracking according to the invention obtains a first digital image taken under a first exposure value (EV) condition and a plurality of second digital images taken under a second exposure value condition, where the EV of the second exposure condition is less than that of the first exposure value condition. The apparatus computes a motion value for each comparative second digital image relative to a reference second digital image by tracking an object in either the respective binary image or reverse binary image of the second digital image, depending on which image has the most objects. The apparatus also compensates for motion of the corresponding second digital image according to each computed motion value, overlaps the motion-compensated images with the reference image to generate a shaky hand compensated image, and corrects a property of the shaky hand compensated image using a property of the first digital image.

In a preferred embodiment of the invention, the first digital image is a preview image, and the second digital image is a captured still image. The preview image is a digital image displayed on a view finder at a short frame interval before an operation of a shutter, and the captured still image is a still digital image of a subject taken with a resolution set by a user at the time of shutter operation. However, the invention is not limited in this regard. The first digital image should be interpreted as a digital image captured under a higher exposure value condition than the second digital image and taken at such a short frame interval to remove the influence of the shaky hands effect.

Referring to FIG. 1, the apparatus for digital image stabilization using object tracking according to the invention includes an image signal processing unit 110, a shaky hand compensating unit 120, and an image property correcting unit 130. The image signal processing unit 110 receives a preview image signal taken under a first exposure value condition and a plurality of captured still image signals taken under a second exposure value condition from an image sensor 100. The image signal processing unit 110 performs digital image signal processing, and outputs a preview image at display unit 170 corresponding to the first exposure value condition and a plurality of captured still images corresponding to the second exposure value condition. The shaky hand compensating unit 120 compensates for motion of the comparative captured still images relative to a reference captured still image by tracking an object in the binary images and reverse binary images of the plurality of captured still images, and overlaps the motion-compensated images with the reference image to generate a shaky hand compensated image. The image property correcting unit 130 corrects a property of the shaky hand compensated image using the corresponding property of the preview image.

Preferably, the first exposure value is larger than the second exposure value. That is, EV1>EV2, where EV1 is the first exposure value and EV2 is the second exposure value. Preferably, the first exposure value is an exposure value of an auto exposure mode of a digital photographing device. An exposure value, abbreviated as EV, is defined by parameters including 'f' representing the shutter speed of the image sensor 100 and ISO gain (hereinafter referred to as 'I') representing the sensitivity of the image sensor 100.

The image sensor 100 generates and outputs a preview image (AP) at a short frame interval (for example, 30 f/s) before the shutter of the digital photographing device operates. When the shutter operates, the image sensor 100 continually outputs a plurality of captured still images at a frame interval greater than the frame interval of the preview image. The image sensor 100 may be an image pickup device using CCD (Charge Coupled Device) or CMOS (Complementary Metal-Oxide Semiconductor) technology. However, the invention is not limited to a specific kind of image sensor.

Because the preview image is generated at a very short frame interval, it is free of image blurring caused by the shaky hands of a photographer. The preview image has substantially the same range of the subject as in the plurality of captured still images, and because the preview image is generated in the auto exposure mode, the brightness and the color properties of the subject are retained well.

On the contrary, the captured still image is obtained under a condition of shorter exposure time than the first exposure value condition of the preview image. As the exposure time of the image sensor 100 decreases, the influence of shaky hands also decreases. However, if the exposure time decreases when a captured still image is obtained, the captured still image does not retain the brightness and color properties of the subject as well as the preview image. Also, the captured still image has a size (e.g., a length and a width) set by the user of the digital photographing device that is relatively larger than that of the preview image.

Preferably, the apparatus for digital image stabilization according to the invention further includes a mode converting unit 140 and a sensor controller 150. The mode converting unit 140 converts an exposure value condition of the image sensor 100 from a first exposure value condition to a second exposure value condition. Before operation of the shutter, the mode converting unit 140 controls the sensor controller 150 to set the image sensor 100 to the first exposure value condition and to operate the image sensor 100 in the preview mode. Accordingly, the image sensor 100 generates an analog signal of a preview image at a predetermined frame interval (for example, 30 f/s) and outputs the analog signal to the image signal processing unit 110. The image signal processing unit 110 then digitizes the preview image signal and outputs the preview image to a display unit 170. The display unit 170 displays the preview image in the form of a moving image on the view finder.

When the shutter operates, the mode converting unit 140 adaptively determines the second exposure value condition based on the first exposure value condition, and controls the sensor controller 150 to change the exposure value condition of the image sensor 100 from the first exposure value condition to the second exposure value condition. The image sensor 100 is now configured for the still image capture mode.

Adaptively determining the exposure value condition means determining the second exposure value condition based on the first exposure value condition with respect to a predetermined set of exposure values. For this purpose, a sensor data sheet 160 is preferably provided to create one-to-one mapping between the parameters (i.e. 'f' and 'I' values) that define the first exposure value condition and the parameters (i.e. 'f' and 'I' values) that define the second exposure value condition. The sensor data sheet 160 is loaded and is referenced when the apparatus operates. The invention therefore adaptively determines the second exposure value condition based on the first exposure value condition. Note that the technical configuration for adaptively determining an exposure value condition is not limited to the above-mentioned example.

The mode converting unit 140 controls the sensor controller 150 to set an exposure value condition of the image sensor 100. The sensor controller 150 sets the image sensor 100 to the first exposure value condition before the shutter operates, and sets the image sensor 100 to the second exposure value condition when the shutter operates. The sensor controller 150 receives parameters corresponding to the first and second exposure value conditions from the mode converting unit 140. As mentioned above, the parameters include the shutter speed 'f' and ISO gain 'I'.

When the exposure value condition of the image sensor 100 is set to the second exposure value condition, the sensor controller 150 sends a signal to the image sensor 100 to capture a plurality of captured still images. The image sensor 100 then continually generates a plurality of captured still images at a regular frame interval and outputs the captured still images to the image signal processing unit 110.

Before the shutter operates, the image signal processing unit 110 receives the preview images that are generated in the image sensor 100 at a regular frame interval, performs an analog-to-digital conversion, and outputs the preview images to the display unit 170. When the shutter operates, the image signal processing unit 110 receives the plurality of captured still images generated continually at a regular frame interval from the image sensor 100, performs an analog-to-digital conversion, and outputs digital image signals to the shaky hand compensating unit 120. The preview image data and the captured still image data that have been converted into digital image signals include a brightness signal (Y) and color difference signals (Cb and Cr) for each pixel included in the images. The digital image signal may be a signal in a color coordinate system other than the YUV (YCbCr) color coordinate system, such as, for example, the RGB (Red, Green, Blue) system.

The image signal processing unit 110 converts the preview image into a digital signal and can downscale the preview image to conform to a standard resolution of a display of the view finder (e.g., 320*240 or 240*320). The image signal processing unit 110 converts the plurality of captured still images into digital signals and may downscale the captured still image to conform to an image resolution (320*240 or 256*192) set by the photographer.

The image resolution of the captured still image is set using a user interface. The user interface is a general interface provided to a digital photographing device to operate a shutter and adjust various parameters necessary for obtaining a digital image, such as, for example, focus, optical or digital zoom-in/zoom-out, white balance, or exposure mode of the image sensor 100. When the digital photographing device is mounted in a hand-held terminal such as a mobile phone, the user interface may be embodied as a keypad of the hand-held terminal.

The image signal processing unit 110 is known in the art as an ISP (Image Signal Processor), and a process for digitalizing an image signal is also known in the art. Thus, a detailed description of the image signal processing unit 110 is omitted.

Figure 2:
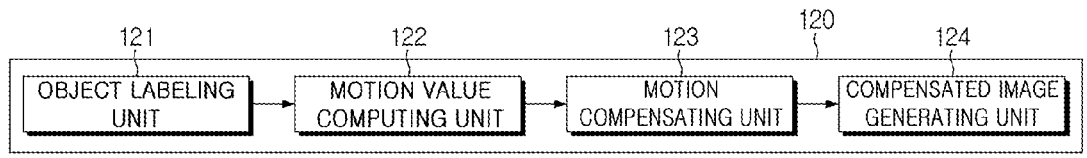
FIG. 2 illustrates a shaky hand compensating unit according to an embodiment of the invention.

As shown in FIG. 2, the shaky hand compensating unit 120 includes an object labeling unit 121, a motion value computing unit 122, a motion compensating unit 123 and a compensated image generating unit 124. The shaky hand compensating unit 120 compensates for motion in each comparative image relative to a reference image using object tracking where the reference image is chosen from the plurality of captured still images. The shaky hand compensating unit 120 overlaps the motion-compensated image(s) with the reference image to generate a shaky hand compensated image. Compensating for motion of the comparative image relative to the reference image using object tracking includes extracting objects included in the reference image and the comparative image, labeling the objects, matching the labeled objects, computing quantitatively a motion value of the matched object(s), and applying the computed motion value to the comparative image.

The object labeling unit 121 receives a plurality of captured still images from the image signal processing unit 110 immediately after the shutter operates. The object labeling unit 121 classifies the plurality of captured still images into one reference image and one or more comparative images. There is at least one comparative image. The object labeling unit 121 then extracts objects from the reference image and each comparative image, and labels the extracted objects. Preferably, the object labeling unit 121 selects the captured still image taken first in time as the reference image. Alternatively, the object labeling unit 121 may select a captured still image taken last or midway in time as the reference image. For example, if five captured still images are taken, the first, third or fifth image may be selected as the reference image.

An object is a group of white pixels connected to each other in a binarized image. When the number of pixels of an object exceeds a critical value (for example, 30,000), the object labeling unit 121 may regard the corresponding object as a background. Preferably, the object labeling unit 121 extracts the object using 4-connected component labeling or 8-connected component labeling. The 4-connected component labeling tracks four pixels of upper, lower, left and right directions based on a target pixel to extract an object. The 8-connected component labeling tracks four pixels diagonal to the target pixel in addition to the four pixels of upper, lower, left and right directions. In addition, the object labeling unit 121 may extract an object using a closed contour object scanning method or an open contour object scanning method. The above-mentioned object extraction methods are well known in the art, and their description is omitted.

Figure 3:
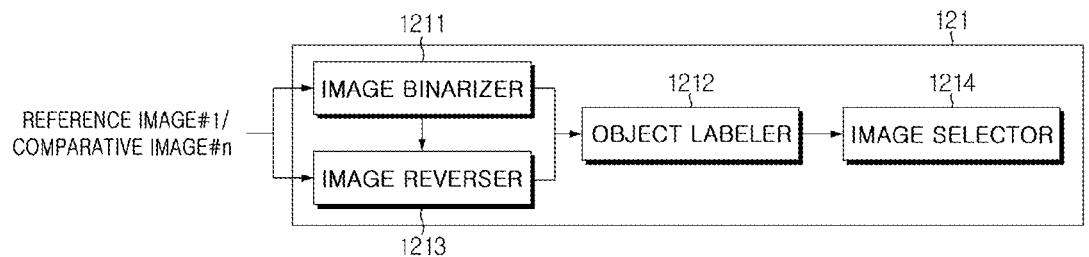
FIG. 3 illustrates an object labeling unit according to an embodiment of the invention.
Figure 4:
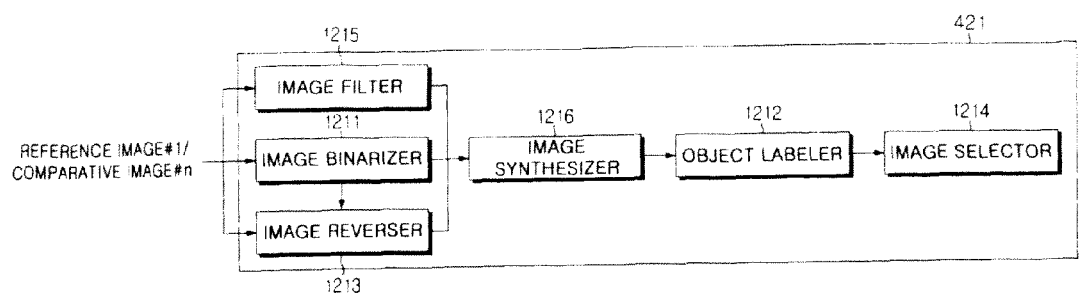
FIG. 4 illustrates an object labeling unit according to another embodiment of the invention.

FIG. 3 illustrates the object labeling unit 121 according to a first embodiment of the invention, and FIG. 4 illustrates the object labeling unit 421 according to a second embodiment of the invention.

Referring to FIG. 3, the object labeling unit 121 includes (1) an image binarizer 1211 for converting the reference image and each comparative image into black-and-white binary images, (2) an image reverser 1213 for converting the binary images of the reference image and each comparative image into reverse binary images by white and black reversion of each binary image, (3) an object labeler 1212 for extracting and labeling objects from each binary and reverse binary image, and (4) an image selector 1214 for (a) comparing the number of objects extracted from the binary image of the reference image with the number of objects extracted from the reverse binary image of the reference image, and (b)

selecting the image (either the binary image or the reverse binary image) having more objects as an object tracking image.

The image binarization process calculates a histogram distribution of an image. A pixel is set as white if its brightness is greater than a specific threshold value, and the pixel is set as black if its brightness is less than the specific threshold value. Hereinafter, a process for setting each pixel as black or white based on a specific threshold value is referred to as a thresholding step. An average brightness value of the image calculated from the histogram distribution may be used as a threshold value. However, the invention is not limited in this regard.

Referring to FIG. 4, the object labeling unit 421 according to a second embodiment of the invention includes (1) an image binarizer 1211 for converting the reference image and each comparative image into a binary image using a thresholding step, (2) an image reverser 1213 for converting the binary images of the reference image and each comparative image into reverse binary images by white and black conversion, (3) an image filter 1215 for filtering the reference image and each comparative image to sharpen the boundaries of the images, and (4) an image synthesizer 1216 for (a) synthesizing the boundary-sharpened images received from the image filter 1215 with the corresponding binary images received from the image binarizer 1211, (b) synthesizing the boundary-sharpened images received from the image filter 1215 with the corresponding reverse binary images received from the image reverser 1213, and (c) outputting the synthesized binary images and the synthesized reverse binary images. The object labeling unit 421 also includes an object labeler 1212 that extracts and labels objects from each synthesized binary image and each synthesized reverse binary image received from the image synthesizer 1216. The object labeling unit 421 further includes an image selector 1214 for (a) comparing the number of objects extracted from a synthesized binary image of the reference image with the number of objects extracted from a synthesized reverse binary image of the reference image, and (b) selecting the image (either the synthesized binary image or the synthesized reverse binary image) having more objects as an object tracking image. The synthesized binary image is a binary image that is synthesized with a boundary-sharpened image, and the synthesized reverse binary image is a reverse binary image that is synthesized with a boundary-sharpened image.

When, as mentioned above, the objects are extracted from the synthesized binary and the synthesized reverse binary images with the sharpened boundaries, the objects are extracted more easily because the boundaries of the objects are enhanced. Preferably, the image filter 1215 is a Laplacian filter or a Sobel edge filter. However, the invention is not limited to a specific kind of image filter.

Referring to FIG. 2, the motion value computing unit 122 receives the labeled object data of the reference image and each comparative image from the object labeling unit 121. The motion value computing unit 122 then matches the object of the reference image with the object of each comparative image and calculates a parameter for each object.

The object data above means object data labeled in a binary image or a reverse binary image that is selected as the object tracking image. That is, if a binary image is selected as an object tracking image, the object data is an object labeled in the binary image of the reference image and each comparative image. On the other hand, if a reverse binary image is selected as an object tracking image, the object data is an object labeled in the reverse binary image of the reference image and each comparative image.

Alternatively, the object data may be an object data labeled in a synthesized binary image or a synthesized reverse binary image that is selected as an object tracking image. That is, if a synthesized binary image is selected as an object tracking image, the object data is an object labeled in the synthesized binary image of the reference image and each comparative image. On the other hand, if a synthesized reverse binary image is selected as an object tracking image, the object data is an object labeled in the synthesized reverse binary image of the reference image and each comparative image.

Figure 7:
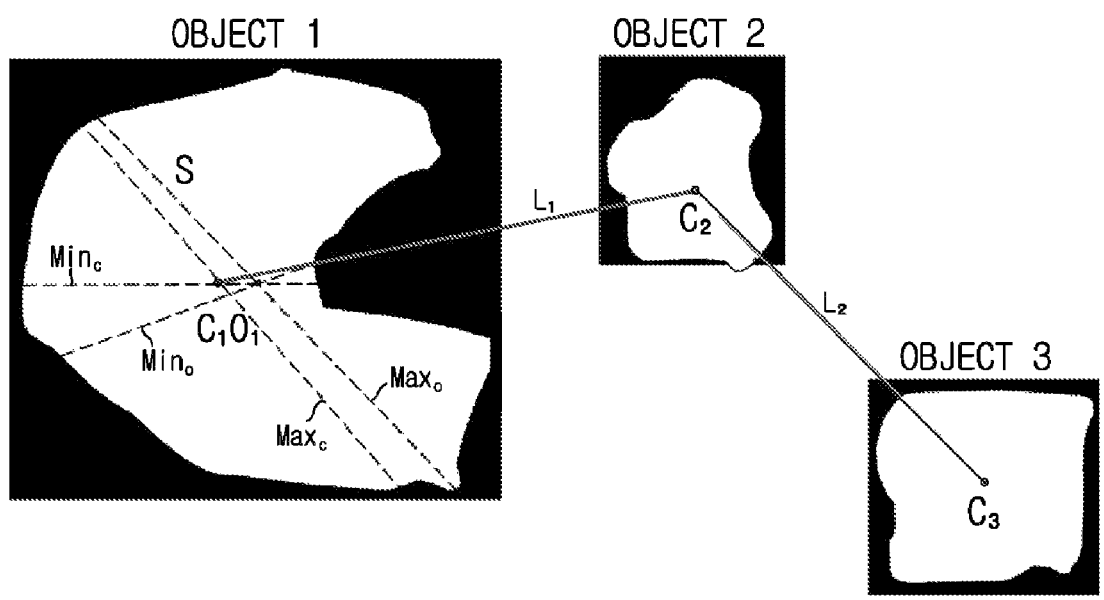
FIG. 7 illustrates, conceptually, the object parameters calculated by a motion value computing unit according to an embodiment of the invention.

FIG. 7 illustrates, conceptually, object parameters calculated by the motion value computing unit 122. An object parameter includes an area (S) of an object, a boundary length (a periphery length of the boundary) of the object, and when the object is contained in a square boundary having a predetermined margin, the center coordinate (O) of the square, a centroid coordinate (C) of the object, a major axis length ($Max_O$) and a minor axis length ($Min_O$) among lines that pass through the center coordinate (O) of the object and meet the boundary of the object at both ends, the angles of $Max_O$ and $Min_O$, a major axis length ($Max_C$) and a minor axis length ($Min_C$) among lines that pass through the centroid coordinate (C) of the object and meet the boundary of the object at both ends, the angles of $Max_C$ and $Min_C$, a length of each line (L) connecting the centroid coordinates (C) of objects, and the angle between the lines (L) when centroid coordinates of objects are connected in the labeling order.

Next, the motion value computing unit 122 computes a motion value of each comparative image using the calculated object parameter. The motion value of each comparative image means a motion value of a comparative object tracking image relative to a reference object tracking image. The reference object tracking image is any one of a binary image, a reverse binary image, a synthesized binary image, or a synthesized reverse binary image of the reference image. The comparative object tracking image is any one of a binary image, a reverse binary image, a synthesized binary image, or a synthesized reverse binary image of a comparative image. The comparative object tracking image and the reference object tracking image are of the same kind. The motion value indicates quantitatively the degree of movement of the comparative object tracking image relative to the reference object tracking image. Specifically, the motion value includes any one selected from the group consisting of a motion value according to translation, rotation, scaling, shear, or a combination thereof.

The motion value of the comparative object tracking image is computed by geometrically analyzing the matched object parameter of the reference object tracking image and the comparative object tracking image. For example, the motion value according to translation is computed by averaging the differences in the center coordinate or the centroid coordinate between the matched objects of the reference object tracking image and the comparative object tracking images.

The motion value according to rotation is computed by matching the lines (L) connecting the centroid coordinates in the reference object tracking image to the lines (L) in the comparative object tracking images, and averaging the angles between the matched lines. Alternatively, the motion value according to rotation may be computed by matching the lines (L) connecting the centroid coordinates in the reference object tracking image to the lines (L) in the comparative object tracking images, and averaging the differences in angle between a preset reference axis and the matched connection lines (L).

The motion value according to scaling is computed by averaging the ratios of major axis length, the ratios of minor axis length, the ratios of boundary length or area between the matched objects of the reference object tracking image and the comparative object tracking images.

The motion value according to shear is computed using ratios of major axis length, ratios of minor axis length, ratios of boundary length, and ratios of area between the matched objects of the reference object tracking image and the comparative object tracking images. Alternatively, motion value according to shear may be computed by using a gradient of a distribution profile when the distribution of the differences in angle between a preset reference axis and the connection lines of centroid coordinates of the reference object tracking image and the comparative object tracking images is calculated in the horizontal and vertical directions of the images.

When various object parameters of the reference object tracking image and the comparative object tracking image are known, a motion value of the comparative object tracking image relative to the reference object tracking image may be alternatively computed by methods other than those mentioned above.

The motion value computing unit 122 outputs the computed motion value data of each comparative image to the motion compensating unit 123. The motion compensating unit 123 computes a matrix that is used to compensate for motion of each comparative image. Preferably, the matrix is an affine transformation matrix. (The invention is not, however, limited to a specific kind of matrix.) The affine transformation matrix is known for performing matrix transformations including translation, rotation, scaling and shear. The row and column data of the matrix can be operated on by the computed motion value. A technique for deducing a matrix by the motion value is known in the art, and its description is accordingly omitted.

The motion compensating unit 123 compensates for motion in each comparative image by deducing a transformation matrix of each comparative image and performing a matrix operation on each comparative image by the deduced matrix. The motion compensating unit 123 then outputs each motion-compensated comparative image and the reference image to the compensated image generating unit 124. The motion compensation of a comparative image includes any one of the following: motion compensation according to translation, motion compensation according to rotation, motion compensation according to scaling, motion compensation according to shear, or combinations thereof. To reduce the operations related to motion compensation of a comparative image, performing the operations in the order of motion compensations according to shear, scaling, rotation, and translation is preferred. The invention is not, however, limited in this regard.

The compensated image generating unit 124 receives each motion-compensated comparative image and the reference image from the motion compensating unit 123. The compensated image generating unit 124 then overlaps all comparative images with the reference image to generate and output a shaky hand compensated image. The image overlapping includes averaging the color data of the reference image and the comparative images for each color channel and replacing a color data of the reference image with the obtained average value of color data for each color channel. In some cases, the color data of the reference image may be excluded.

Figure 5:
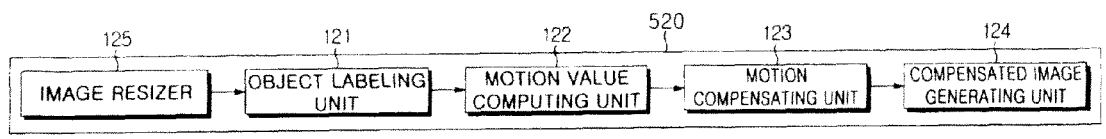
FIG. 5 illustrates a shaky hand compensating unit according to another embodiment of the invention.

FIG. 5 illustrates another embodiment of the shaky hand compensating unit. Shaky hand compensating unit 520 includes an image resizer 125 coupled before the object labeling unit 121. The image resizer 125 reduces the sizes of the preview image and the plurality of captured still images by either downscaling the images or clipping the boundaries of the images. Boundary clipping for image resizing is performed when an object tends to concentrate on the center portion of an image. If an image resizer 125 is included in the shaky hand compensating unit 120, the image binarizer 1211, the image reverser 1213, the object labeler 1212, and the image filter 1215 perform operations on the smaller, resized image, thus reducing operational overhead. After the motion value computing unit 122 computes a motion value of a comparative image resized by downscaling, the motion value computing unit 122 may convert the computed motion value on the basis of an original comparative image based on the downscaling factor.

Figure 6:
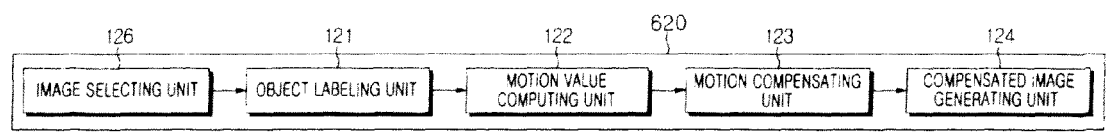
FIG. 6 illustrates a shaky hand compensating unit according to yet another embodiment of the invention.

FIG. 6 shows yet another embodiment of a shaky hand compensating unit 120. Shaky hand compensating unit 620 includes an image selecting unit 126 coupled before the object labeling unit 121. The image selecting unit 126 classifies the plurality of captured still images into a reference image and comparative images. The basis for selecting the reference image is mentioned above. The image selecting unit 126 computes a motion vector for each comparative image relative to the reference image. The motion vector of each comparative image is an index that indicates the degree of movement of a comparative image relative to the reference image, and is computed in a typical manner of well-known image compression standards such as MPEG (Moving Picture Experts Group) or H.26x. Then, if the magnitude of a motion vector of a comparative image is excessively large or a motion vector is not computed, the image selecting unit 126 determines that a subject included in the reference image is different from a subject included in the comparative image, and excludes the corresponding comparative image from the images for shaky hand compensation. This may occur because the amount of hand tremor was excessive or another subject suddenly invaded the image pickup range at the time of taking the comparative image. On the other hand, if a motion vector of a comparative image is in a proper range, the image selecting unit 126 determines that the comparative image can be used to compensate for shaky hands effect, and inputs the preview image and the captured still images into the object labeling unit 121. The object labeling unit 121 then performs an object labeling operation as mentioned above.

In addition, the image selecting unit 126 computes quantitatively a difference in brightness between the reference image and a comparative image. If the difference is smaller than a predetermined level, the image selecting unit 126 excludes the corresponding comparative image from the shaky hand compensation. For example, the image selecting unit 126 computes an XOR-operated image between the reference image and a comparative image, calculates an average of the brightness of the XOR-operated image, and defines the calculated average of brightness as a difference in brightness between the reference image and the comparative image. If the difference in brightness between the reference image and the comparative image is smaller than a predetermined level (for example, 0.85), the image selecting unit 126 determines that a meaningful motion of an object does not exist and, thus, unit 126 does not output the corresponding comparative image to the object labeling unit 121. On the other hand, if the difference between the reference image and the comparative image is larger than a predetermined level (for example, 0.85), the image selecting unit 126 determines that a meaningful motion of an object does exist and, accordingly, outputs the corresponding comparative image to the object labeling unit 121. As mentioned above, image selection using the difference in brightness between the reference image and each comparative image can reduce the operational overhead of object labeling.

The image selecting unit 126 may be interposed between the image resizer 125 shown in FIG. 5 and the object labeling unit 121. In this case, the image selecting unit 126 performs the above-mentioned operation on the resized reference image and the resized comparative images.

Figure 8:
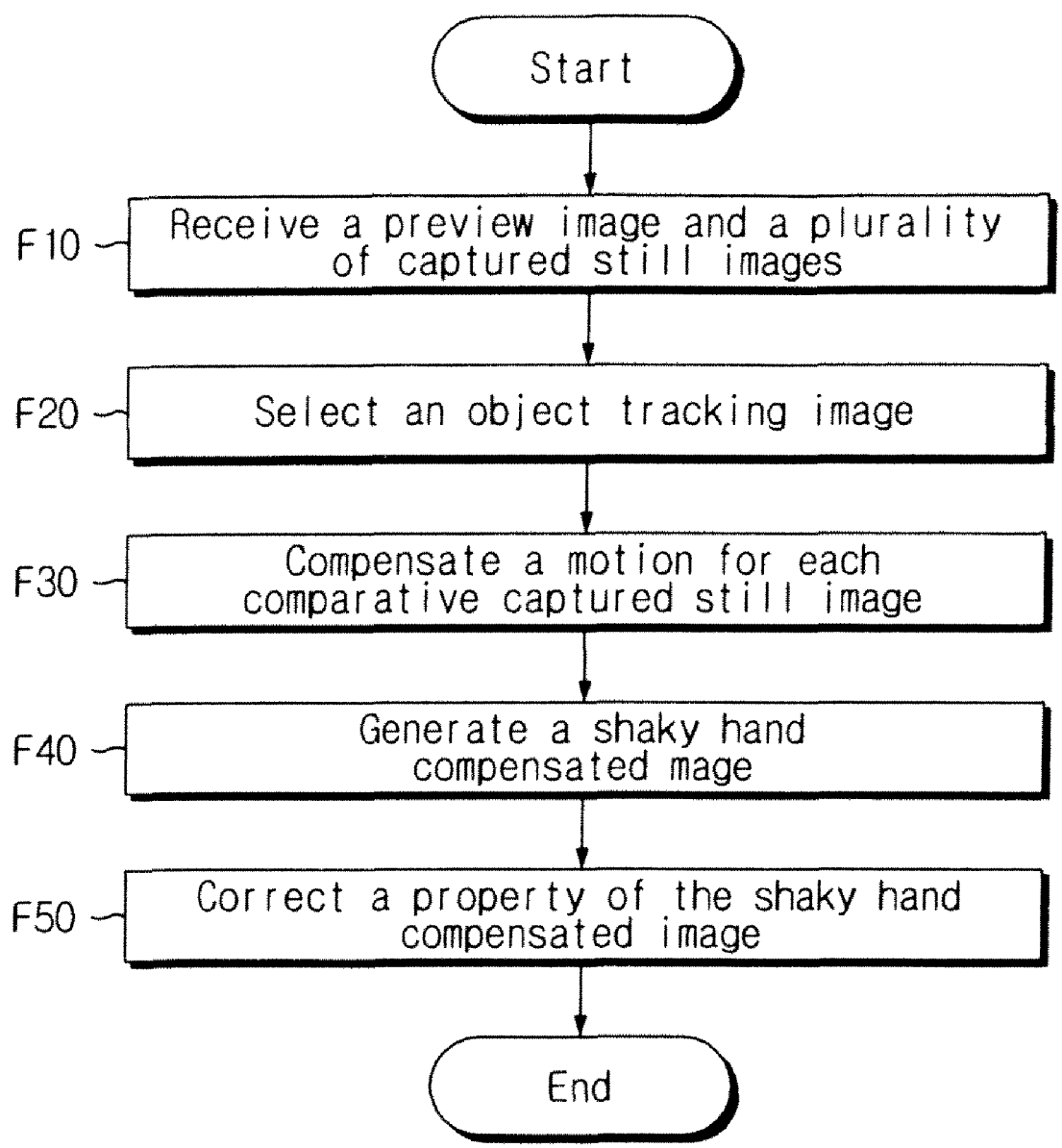
FIG. 8 illustrates a method for digital image stabilization using object tracking according to an embodiment of the invention.

FIG. 8 shows a method for digital image stabilization using object tracking according to an embodiment of the invention. Each of the described steps is performed by the apparatus of the invention. A preview image and a plurality of captured still images are received (F10). The preview image is obtained under a first exposure value condition and the plurality of captured still images is obtained under a second exposure value condition. The second exposure value condition is adaptively determined based on the first exposure value condition. One of the captured still images is selected as a reference image and the others of the captured still images are considered comparative images. An object tracking image for each captured still image is selected next (F20). The object tracking image is either a binary image or a reverse binary image (whichever has the most objects) of the captured still image. A motion compensation for each comparative captured still image is then performed (F30). The motion compensation is performed based on the reference captured still image by tracking an object in the object tracking image. Next, a shaky hand compensated image is generated by overlapping the motion-compensated comparative images with the reference image (F40). A property of the shaky hand compensated image is then corrected based on a property of the preview image (F50).

Figure 9:
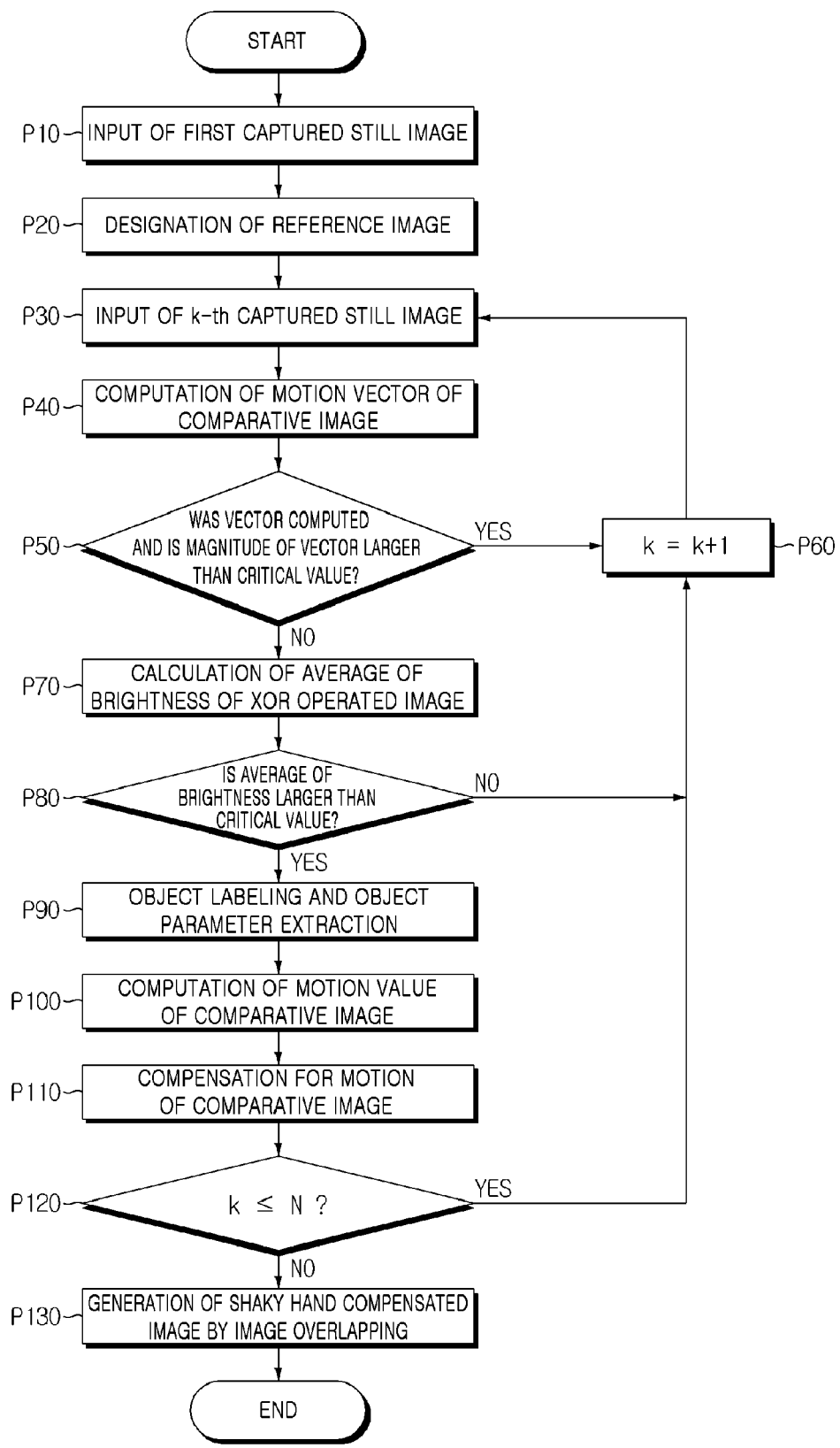
FIG. 9 illustrates a process for generating a shaky hand compensated image according to an embodiment of the invention.

FIG. 9 shows a process for generating a shaky hand compensated image according to an embodiment of the invention. Each of the described steps is performed by the shaky hand compensating unit. A first captured still image is received (P10) and designated as a reference image (P20). A second captured still image (k=2) is then received, which becomes a comparative image (P30). Note that a captured still image used as the reference image may be arbitrarily changed, and captured still images received after the reference image become comparative images. At P40, a motion vector of the comparative image relative to the reference image is computed. The computed motion vector is compared with a critical value to determine whether the magnitude of the motion vector exceeds a preset critical value (P50). If it is determined at P50 that the motion vector was not computed or that the computed motion vector exceeded a critical value, an object labeling step of the comparative image is not performed. Instead, an order k is incremented at P60 and the process returns to P30. If it is determined at P50 that the computed motion vector did not exceed a critical value, P70 is performed to compute quantitatively a difference in brightness between the reference image and the comparative image. For example, an XOR-operated image between the reference image and the comparative image is computed, an average brightness of the XOR-operated image is calculated, and the average brightness is defined as a difference in brightness between the reference image and the comparative image.

Next, the process checks whether the difference in brightness between the reference image and the comparative image exceeds a preset critical value. If the difference in brightness exceeds a preset critical value, a meaningful movement of an object exists in the comparative image and an object labeling step is performed (P90). If the difference in brightness does not exceed a preset critical value, an object labeling step of the comparative image is omitted and P60 is performed.

Objects are extracted from the reference image and the comparative image, and object parameters are computed through a geometric operation (P90). That is, (1) the reference image and each comparative image are converted into binary images (or synthesized binary images) and reverse binary images (or synthesized reverse binary images), (2) the type of binary image from which more objects are detected is chosen as the object tracking image, (3) the objects are labeled on a reference object tracking image and each comparative object tracking image, and (4) object parameters are calculated. The object labeling and object parameter calculation are described above.

Next, the object parameters extracted from the reference object tracking image and each comparative object tracking image are matched with each other, and a motion value of each comparative image is computed relative to the reference image (P100). A motion value of each comparative image includes any of the following: a motion value according to translation, a motion value according to rotation, a motion value according to scaling, a motion value according to shear, or combinations thereof. A matrix for motion compensation is then computed using the computed motion value, and a comparative image is compensated for motion by affine transformation (P110).

The process next checks whether an order (k) of a motion-compensated comparative image has reached a preset number (N) (P120). N is the number of captured still images used to compensate an image for shaky hands and is set in advance. According to P120, if k is smaller than or equal to N, P60 is performed to increment order k of the comparative image by one, and the process returns to P30. The next captured still image is then inputted as a comparative image, a motion value of the comparative image is computed, and the comparative image is compensated for motion using the motion value. This process repeats until k is larger than N. When k is larger than N, all comparative images are compensated for motion, and P130 is then performed.

The motion-compensated comparative image and the comparative image without substantial motion (where motion of an object is determined to not substantially exist) are overlapped with the reference image to generate a shaky hand compensated image (P130). The image overlapping is described above. In some cases, the comparative image where motion of an object is determined to not substantially exist may be excluded from images for image overlapping. Thus, P40 to P80 may be omitted for those images to reduce the operational overhead of the shaky hand compensating unit 120.

Although not shown in FIG. 9, the invention may further include resizing the reference image and each comparative image by either downscaling the images or by clipping the boundaries of the images prior to extracting the objects from the reference image and each comparative image. The image resizing may reduce the operations required for object extraction.

After the shaky hand compensated image is generated as described above, the image property correcting unit 130 corrects a property of the shaky hand compensated image using a property of the preview image. The preview image is generated at the latest time prior to shutter operation, and can be referenced from a frame memory.

Figure 10:
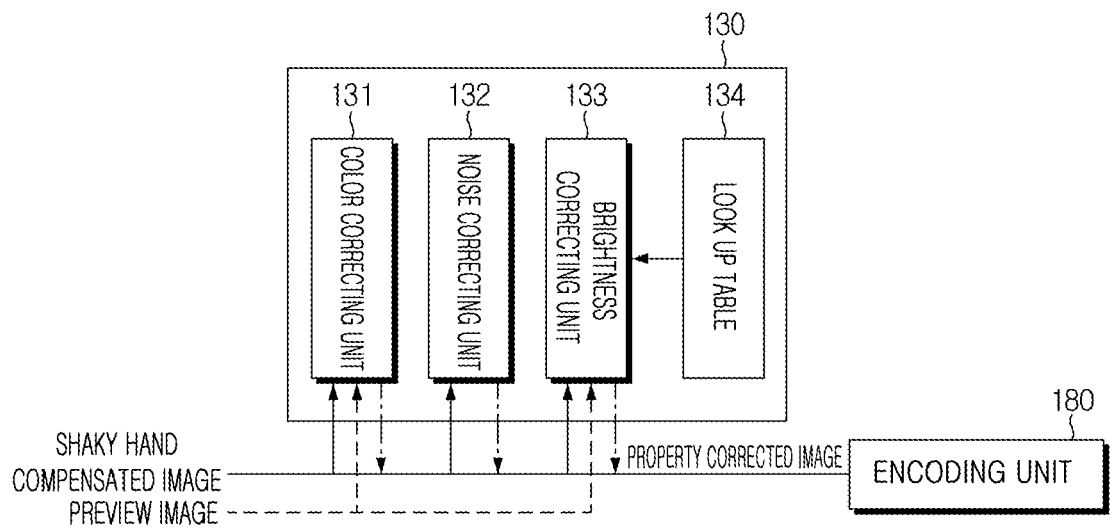
FIG. 10 illustrates an image property correcting unit according to an embodiment of the invention.

FIG. 10 illustrates a configuration of the image property correcting unit 130 according to an embodiment of the invention. The image property correcting unit 130 includes a color correcting unit 131, a noise correcting unit 132, and a brightness correcting unit 133. The color correcting unit 131 corrects the color of the shaky hand compensated image by either replacing pixel data of the shaky hand compensated image with pixel data of the preview image or interpolating pixel data of the shaky hand compensated image based on the pixel data of the preview image taking into account a size ratio between the preview image and the shaky hand compensated image. The color correcting unit 131 outputs the color-corrected shaky hand compensated image to the noise correcting unit 132. The noise correcting unit 132 removes the noise and false color of the shaky hand compensated image using various well-known noise filters, and outputs the noise-removed shaky hand compensated image to the brightness correcting unit 133. The filter may include, for example, a low pass filter, a Median filter, a Gaussian filter, a Laplacian of Gaussian filter or a Difference of Gaussian filter. The invention is not, however, limited in this regard, and other well-known filtering techniques may be used to remove noise.

The brightness correcting unit 133 performs the following: computes quantitatively a difference in brightness between the preview image and the shaky hand compensated image, determines adaptively a brightness correcting intensity of the shaky hand compensated image, and corrects the brightness of the shaky hand compensated image using the determined brightness correcting intensity.

Figure 11:
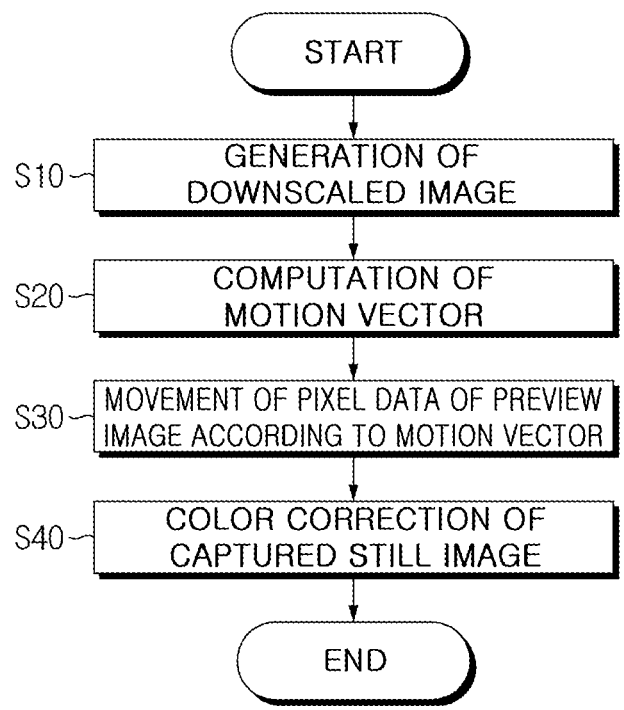
FIG. 11 illustrates a process in which a color correcting unit included in the image property correcting unit corrects color of a shaky hand compensated image based on a preview image according to an embodiment of the invention.

The operations of the color correcting unit 131 and the brightness correcting unit 133 are described with reference to FIGS. 11 and 12, respectively. FIG. 11 shows a process, in which the color correcting unit 131 corrects the color of the shaky hand compensated image based on the preview image. In particular, the color correcting unit 131 scales the size of the shaky hand compensated image to the size of the preview image to generate a downscaled image (S10). The color correcting unit 131 next computes a motion vector of the downscaled image using the preview image as the reference image (S20). The motion vector indicates a movement direction and a movement amount of an object in the downscaled image relative to the preview image. The motion vector may be computed in a manner of well-known image compression standards such as MPEG (Moving Picture Experts Group) or H.26x. That is, the motion vector is computed in such a way that the downscaled image is divided into blocks of uniform size, wherein an area of the reference image from which each block was moved is inferred. After the motion vector is computed, the color correcting unit 131 moves a location of each pixel data of the preview image according to the motion vector (S30). The color correcting unit 131 then corrects the pixel data of the shaky hand compensated image using an interpolation method based on the preview image, where a location movement process of each pixel data is completed (S40). That is, the color correcting unit 131 converts a location $(x_i, y_j)$ of each pixel data of the preview image into a location $(X_I, Y_J)$ of the shaky hand compensated image based on the scaling factor (applied when generating the downscaled image). Next, the color correcting unit 131 replaces the pixel data corresponding to the location $(X_I, Y_J)$ of the shaky hand compensated image with the pixel data corresponding to the location $(x_i, y_j)$ of the preview image. The number of pixels of the preview image is less than that of the shaky hand compensated image, and thus all pixel data of the shaky hand compensated image is not replaced by the pixel data of the preview image. The color correcting unit 131 therefore interpolates pixel data of the shaky hand compensated image using the adjacent replaced pixel data to fill the pixels that are not replaced by the pixel data of the preview image. The interpolation method includes Bi-linear, Bi-Cubic or B-spline; however, the invention is not limited in this regard.

Figure 12:
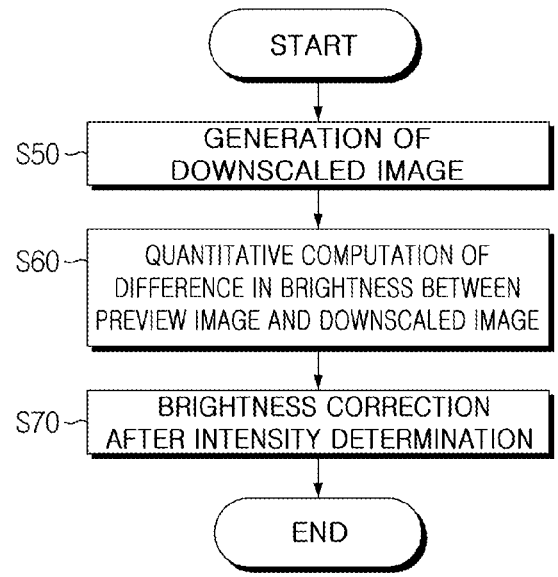
FIG. 12 illustrates a process in which a brightness correcting unit included in the image property correcting unit corrects brightness of a shaky hand compensated image based on a preview image according to an embodiment of the invention.

FIG. 12 shows a process in which the brightness correcting unit 133 corrects brightness of the shaky hand compensated image based on the preview image. In particular, the brightness correcting unit 133 downscales the shaky hand compensated image to the size of the preview image to generate a downscaled image (S50). At this time, S50 need not be performed separately, and the downscaled image generated for the color correction may be used again. Next, the brightness correcting unit 133 computes quantitatively a difference in brightness between the downscaled image and the preview image (S60). The difference in brightness may be computed using a difference in average values of histograms between the two images. For example, in the case where average values of histograms of the downscaled image and the preview image are '85' and '140', respectively, the difference in average values is '55'. The brightness correcting unit 133 next determines adaptively a brightness correcting intensity according to the difference in average values, and corrects the brightness of the shaky hand compensated image by the determined intensity (S70). A gamma function or a Retinex algorithm may be applied to the brightness correction. In this case, the brightness correcting intensity is an intensity of a gamma function or Retinex algorithm. To adaptively select a brightness correcting intensity, a lookup table 134 could be used that has selectable intensity levels in accordance with differences in average values.

The difference in brightness between the shaky hand compensated image and the preview image may be computed quantitatively by a difference between parameters that define the first exposure value and the second exposure value. That is, a difference in brightness between the shaky hand compensated image and the preview image may be computed by a difference between parameters, i.e., 'f' and 'I', that define the first exposure value and the second exposure value. For example, in the case that 'f' and 'I' values corresponding to the first exposure value are '1/30 ' and '200', respectively, and 'f' and 'I' values corresponding to the second exposure value are '1/60 ' and '100', respectively, the differences in shutter speed and ISO gain are computed quantitatively as '1/60 ' and '100', respectively. The brightness correcting unit 133 next determines adaptively a brightness correcting intensity by the differences in 'f' and 'I' values and corrects the brightness of the shaky hand compensated image. A gamma function or a Retinex algorithm may be applied to the brightness correction in the same way as mentioned above. In this case, the brightness correcting intensity is an intensity of a gamma function or Retinex algorithm. To adaptively select a brightness correcting intensity in accordance with this method, a lookup table could be used that has selectable intensity levels in accordance with differences in 'f' and 'I' values.

The gamma function or Retinex algorithm used to correct brightness of the shaky hand compensated image is known in the art, and its detailed description is thus omitted. The invention is not, however, limited to a specific kind of brightness correcting function or algorithm, and various other known techniques for adjusting brightness of the shaky hand compensated image may be used.

After being processed by the color correcting unit 131, the noise correcting unit 132, and the brightness correcting unit 133 correct color, the shaky hand compensated image is encoded and outputted in the form of an image file. For this purpose, the apparatus for digital image stabilization may further include an encoding unit 180 coupled after the image property correcting unit 130. Preferably, the encoding unit 180 encodes the shaky hand compensated image by the JPEG standards to generate and output an image file. However, the invention is not limited to a specific encoding method. The image file may be stored in an inactive storage medium of the digital photographing device, such as, for example, a flash memory.

In the above-mentioned embodiment, the image property correcting unit 130 corrects the properties of the shaky hand compensated image in the order of color, noise, and brightness. However, the invention is not limited to a specific order of correcting the properties of the shaky hand compensated image, and image property correction may be performed in an arbitrary order.

Figure 13:
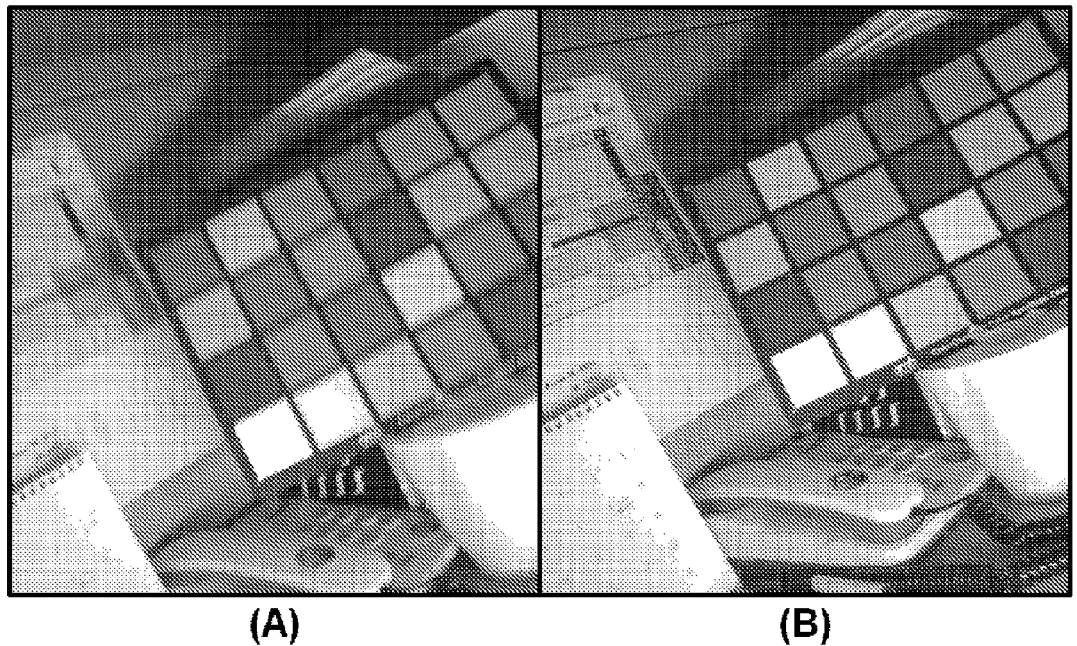
FIG. 13(A) illustrates an image taken by a typical digital photographing device in an auto exposure mode without an image stabilization function with an image.
FIG. 13(B) illustrates the same images taken by a digital photographing device implementing a method for digital image stabilization using object tracking according to an embodiment of the invention.

FIG. 13 compares an image (A) taken by a typical digital photographing device in an auto exposure mode without an image stabilization function with the same image (B) taken by a digital photographing device executing the digital image stabilization method using object tracking according to the invention. As shown in FIG. 13, the image obtained with the digital image stabilization method according to the invention is free of an image blurring phenomenon and is brighter and clearer.

The method for digital image stabilization according to the invention may be incorporated as a computer readable code in a computer readable storage medium. The computer readable storage medium includes all kinds of storage devices for storing data readable by a computer system. Some examples of the computer readable medium are ROM, RAM, CD-ROM, a magnetic tape, a floppy disc or an optical data storage device. The computer readable medium may store a code that is dispersed in computer systems connected to each other via a network and is readable by a computer through a dispersion method.

According to an aspect of the invention, unlike EIS or OIS techniques, the invention can correct an image blurring phenomenon caused by shaky hands without hardware for measuring a degree of shaky hands, such as an angular velocity sensor or a prism. Consequently, this invention reduces the manufacturing cost of a digital photographing device and produces a digital still image of good quality.

According to another aspect of the invention, unlike a DIS technique, the invention does not involve digital zoom when storing a captured still image. Thus, this invention can produces a digital still image of better quality than that of a DIS technique.

According to another aspect of the invention, the invention corrects properties of a captured still image using a preview image that retains the brightness and color properties of a subject. Thus, this invention can produce a clear and bright digital still image.

According to yet another aspect of the invention, the invention uses a filter to remove the noise created when correcting the color data of a captured still image. Thus, this invention improves the quality of an image.

Note that only a few embodiments of the invention are described above. Other implementations, enhancements and variations can be made based on the invention described and illustrated herein. The invention is therefore only limited by the following claims.

What is claimed is:

1. An apparatus for digital image stabilization comprising:
an image signal processing unit operative to output a first digital image obtained under a first exposure value condition and a plurality of second digital images obtained under a second exposure value condition;
a compensating unit operative to:
compensate for motion in a plurality of comparative second digital images relative to a reference second digital image by tracking an object in an object tracking image where the object tracking image is either a binary image or a reverse binary image, whichever has more objects, of a respective comparative second digital image, and
generate a shaky hand compensated image by overlapping the motion-compensated images with the reference image; and
an image property correcting unit operative to correct a property of the shaky hand compensated image based on a property of the first digital image, wherein the compensating unit includes:
an object labeling unit operative to:
track an object in an image among binary images and reverse binary images of the reference image and each comparative image, and label the object; a motion value computing unit operative to:
match an object parameter of each comparative image with an object of the reference image, calculate an object parameter of each comparative image, and compute a motion value for each comparative image using the calculated object parameter; a motion compensating unit operative to apply each computed motion value to a corresponding comparative image to compensate for motion of each comparative image; and a compensated image generating unit operative to overlap each motion-compensated comparative image with the reference image to generate a shaky hand compensated image.

2. The apparatus of claim 1, wherein:
the first digital image is a preview image taken under an exposure value condition of an auto exposure mode, and
the plurality of second digital images is a respective plurality of captured still images taken continually at a regular interval under an exposure value condition that is different than the exposure value condition of the auto exposure mode.

3. The apparatus of claim 1, further comprising:
a sensor controller operative to change an exposure value condition of an image sensor coupled to the image signal processing unit;
a sensor data sheet comprising a mapping between a plurality of second exposure value conditions and a plurality of first exposure value conditions; and
an exposure mode converting unit operative to:
determine the second exposure value condition based on the first exposure value condition by referencing the sensor data sheet, and
control the sensor controller to change the exposure value condition of the image sensor to the second exposure value condition.

4. The apparatus of claim 1, wherein the object labeling unit includes: an image binarizer operative to convert the reference image and each comparative image into binary images; an image reverser operative to convert the binary images of the reference image and each comparative image into reverse binary images; an object labeler operative to label objects in each binary image and each reverse binary image; and
an image selector operative to: compare the number of objects included in the binary image of the reference image with the number of objects included in the reverse binary image of the reference image, and select an image having more objects as an object tracking image.

5. The apparatus of claim 1, wherein the object labeling unit further includes:
an image filter operative to filter the reference image and each comparative image to sharpen boundaries of the images; and an image synthesizer operative to: synthesize the boundary-sharpened images received from the image filter with the binary images received from the image binarizer, synthesize the boundary-sharpened images received from the image filter with the reverse binary images received from the image reverser, and output the synthesized binary images and the synthesized reverse binary images, wherein the object labeler labels objects in the synthesized binary images and the synthesized reverse binary images.

6. The apparatus of claim 1, further comprising an image resizer coupled before the object labeling unit and operative to resize the plurality of second digital images by either scaling sizes of the second digital images to a predetermined size or clipping boundaries of a predetermined width from the second digital images.

7. The apparatus of claim 1, further comprising an image selecting unit coupled before the object labeling unit and operative to exclude a comparative image from images for object labeling when the magnitude of a motion vector of the comparative image relative to the reference image exceeds a first critical value.

8. The apparatus of claim 1, further comprising an image selecting unit coupled before the object labeling unit and operative to exclude a comparative image from images for object labeling when a difference in brightness between the reference image and the comparative image does not exceed a second critical value.

9. The apparatus of claim 1, wherein the image property correcting unit includes a color correcting unit operative to correct a color of the shaky hand compensated image by:
   replacing pixel data of the shaky hand compensated image with pixel data of the first digital image; or
   interpolating pixel data of the shaky hand compensated image based on pixel data of the first digital image in consideration of a size ratio between the first digital image and the shaky hand compensated image.

10. The apparatus of claim 1, wherein the image property correcting unit includes a brightness correcting unit operative to:
   compute quantitatively a difference in brightness between the first digital image and the shaky hand compensated image;
   select a brightness correcting intensity; and
   correct the brightness of the shaky hand compensated image by the selected intensity.

11. A method for digital image stabilization comprising:
   receiving a first digital image obtained under a first exposure value condition and a plurality of second digital images obtained under a second exposure value condition;
      selecting an object tracking image where the object tracking image is an image having the most objects among a binary image and a reverse binary image of one of the plurality of second digital images, the plurality of second digital images including a reference image and at least one comparative image; tracking an object in the object tracking image; labeling the object; matching an object of each comparative image with an object of the reference image; calculating an object parameter of each comparative image; computing a motion value for each comparative image using the calculated object parameter; compensating for motion of each comparative image by applying each computed motion value to a corresponding comparative image; generating a shaky hand compensated image by overlapping each motion-compensated comparative image with the reference image; and correcting a property of the shaky hand compensated image based on a property of the first digital image.

12. The method of claim 11, further comprising before the receiving of first and second digital images:
   loading a sensor data sheet mapping a set of second exposure value conditions to a set of first exposure value conditions;
   sensing the first exposure value condition under which the first digital image is taken;
   determining the second exposure value condition by referencing the sensor data sheet; and
   changing an exposure property of an image sensor from the first exposure value condition to the second exposure value condition.

13. The method of claim 11, wherein:
   the first digital image is a preview image taken under an exposure value condition of an auto exposure mode, and
   the plurality of second digital images is a respective plurality of captured still images taken continually at a regular interval under an exposure value condition that is different than the exposure value condition of the auto exposure mode.

14. The method of claim 11, wherein the selecting an object tracking image includes:
   classifying the plurality of second digital images into a reference image and comparative images;
   converting the reference image and each comparative image into binary images and reverse binary images;
   labeling objects in each binary image and each reverse binary image;
   comparing the number of objects included in the binary image of the reference image with the number of objects included in the reverse binary image of the reference image; and
   selecting an image having more objects as an object tracking image.

15. The method of claim 11, wherein the selecting an object tracking image includes:
   classifying the plurality of second digital images into a reference image and comparative images;
   converting the reference image and each comparative image into boundary-sharpened images;
   converting the reference image and each comparative image into binary images and reverse binary images;
   synthesizing each binary image with each corresponding boundary-sharpened image;
   synthesizing each reverse binary image with each corresponding boundary-sharpened image;
   labeling objects in each synthesized binary image and in each synthesized reverse binary image;
   comparing the number of objects included in the synthesized binary image of the reference image with the number of objects included in the synthesized reverse binary image of the reference image; and
   selecting an image having more objects as an object tracking image.

16. The method of claims 14, further comprising before converting the reference and comparative images:
   resizing each second digital image by either scaling the second digital image to a predetermined size or clipping a boundary of a predetermined width from the second digital image.

17. The method of claim 14, further comprising before converting the reference and comparative images:
   excluding a comparative image from images for motion compensation when the magnitude of a motion vector of the comparative image relative to the reference image exceeds a first critical value.

18. The method of claim 14, further comprising before converting the reference and comparative images:

excluding a comparative image from images for motion compensation when a difference in brightness between the reference image and the comparative image does not exceed a second critical value.

19. The method of claim 11, wherein the correcting of a property includes correcting the color of the shaky hand compensated image by:

replacing a pixel data of the shaky hand compensated image with pixel data of the first digital image; or interpolating pixel data of the shaky hand compensated image based on pixel data of the first digital image in consideration of a size ratio between the first digital image and the shaky hand compensated image.

20. The method of claim 11, wherein the correcting of a property includes correcting the brightness of the shaky hand compensated image by:

computing quantitatively a difference in brightness between the first digital image and the shaky hand compensated image;

selecting a brightness correcting intensity; and correcting the brightness of the shaky hand compensated image by the selected intensity.

* * * * *